United States Patent Office 3,221,037
Patented Nov. 30, 1965

3,221,037
STABLE LEAD ALKYL COMPOSITIONS
Shirl E. Cook and Thomas O. Sistrunk, Baton Rouge, La., assignors to Ethyl Corporation, New York, N.Y., a corporation of Virginia
No Drawing. Filed May 27, 1963, Ser. No. 283,543
20 Claims. (Cl. 260—437)

This invention relates to improved tetraalkyllead antiknock compositions having enhanced thermal stability.

This application is a continuation-in-part of our prior copending application Serial No. 200,965, filed June 8, 1962.

Alkyllead antiknock compounds must be adequately protected against thermal decomposition during storage and shipment. Otherwise upon reaching sufficiently high temperatures, the alkyllead compounds will undergo rapid thermal decomposition with the evolution of large quantities of gas, which may lead to violent explosions.

Ethylene dibromide is a known alkyllead thermal stabilizer of considerable effectiveness; but when present with tetramethyllead in a mole ratio as high as 1:1 (70 percent by weight of the dibromide based on the tetramethyllead), it does not afford optimum protection against thermal decomposition of the tetramethyllead at elevated temperatures. Tests have shown that such compositions often decompose with considerable explosive force. On the other hand with tetraethyllead or mixtures of tetraethyllead with other tetraalkyllead compounds, the presence of ethylene dibromide in a mole ratio of 1:1 relative to the total tetraalkyllead content confers upon the resultant antiknock fluid composition adequate thermal stability. Even at the concentration of 0.5 mole per mole of tetraethyllead alone or admixed with other tetraalkyllead compounds, the ethylene dibromide is sufficiently effective to inhibit alkyllead thermal decomposition although, of course, greater margins of safety are always desirable. So far as is known an ethylene dibromide concentration equivalent to 0.5 mole per mole of tetraethyllead (or mixtures of tetraethyllead with other tetraalkyllead compounds) is the lowest concentration that has been put into commercial practice.

However, more recent developments in the art make it extremely desirable to effect still further reductions in ethylene dibromide concentration. Such reductions would effectively lower the costs of the resultant antiknock fluid as ethylene dibromide is expensive. Further reductions in the concentration of ethylene dibromide would also tend to further reduce certain problems caused by corrosion of engine parts, particularly of exhaust valves.

However as the concentration of ethylene dibromide in tetraethyllead-containing antiknock fluids is decreased below about 0.5 mole per mole of the tetraethyllead the thermal stability of the antiknock fluid progressively and sharply diminishes. In standard 195° C. induction time tests, 0.5 mole of ethylene dibromide per mole of tetraethyllead provides less than 50 percent of the thermal stability provided by 0.8 mole of ethylene dibromide. The thermal stability conferred upon tetraethyllead by 0.3 mole of ethylene dibromide per mole of the alkyllead compound was only about 25 percent as much as when the ethylene dibromide concentration was 0.8 mole per mole of tetraethyllead. When the ethylene dibromide: tetraethyllead mole ratio was reduced to 0.1:1 and the test repeated, the thermal stability was only about 1 percent that of the materials in a mole ratio of 0.8:1 respectively. Ethylene dichloride—another commonly used antiknock fluid ingredient—does not improve upon the thermal stability of these alkyllead-ethylene dibromide antiknock fluid compositions. In fact, in some instances the copresence of the ethylene dichloride has detracted from the thermal stabilizing effectiveness of the ethylene dibromide.

There is, therefore, a great need for a means by which the ethylene dibromide concentration of tetraethyllead-containing antiknock fluid compositions can be reduced while at the same time compensating in a cheap and efficient manner for the sharp loss in thermal stability which such ethylene dibromide reductions would otherwise cause. This must be accomplished in a manner such that the ultimate usage for which the antiknock fluid composition is intended is not itself interfered with. In other words the accomplishment of this objective must not result in an antiknock fluid composition which is substantially less suitable for use as a gasoline antiknock than the presently known antiknock fluid formulations containing substantial amounts of ethylene dibromide.

According to the present invention, we provide a concentrated antiknock fluid composition containing tetraethyllead or mixtures of tetraethyllead with other tetraethyllead compounds and a synergistic thermal stabilizer mixture of from about 0.05 to about 0.4 mole of ethylene dibromide per mole of tetraethyllead and from about 1 to about 150 (preferably from about 1 to about 30) weight percent, based on the weight of the tetraethyllead, of a hydrocarbon boiling between about 1° and about 300° C. at atmospheric pressure and having a solubility in tetraethyllead at 25° C. of at least about 5 percent by weight.

Tetraethyllead is used alone or tetraethyllead is admixed with other tetraalkyllead antiknock compounds, e.g., tetramethyllead, ethyltrimethyllead, triethylmethyllead and/or diethyldimethyllead, such that the mole ratio (ethylene dibromide:tetraalkyllead) ranges from about 0.05:1 to about 0.4:1.

Such alkyllead antiknock concentrates fulfill the objectives of the invention in a very efficient and economical manner. The several ingredients of these antiknock fluid compositions coact synergistically, i.e., the thermal stabilization effectiveness of the whole is greater than the sum total of its parts. This unexpected phenomenon which has been verified experimentally in numerous instances therefore compensates for the loss in thermal stability due to the reduction in the concentration of the ethylene dibromide.

Available experimental evidence has further indicated that these synergistic effects subsist with a wide variety of hydrocarbons.

The hydrocarbons used must be miscible or soluble in gasoline so that they do not contribute to engine operating difficulties. When the antiknock fluid compositions of the invention are blended with commercially available gasoline a homogeneous system results and the hydrocarbon ingredient of the present antiknock fluid compositions is readily inducted into the modern gasoline engines where it is consumed along with the gasoline.

In our antiknock fluid compositions, the use of tetraethyllead itself is preferred because it is the cheapest and most effective antiknock for use in most present-day gasolines. However, we may also use tetraethyllead-containing mixtures of other alkyllead compounds—i.e. mixtures of tetraethyllead with one or more of the following: tetramethyllead, ethyltrimethyllead, diethyldimethyllead, triethylmethyllead. Examples of such mixed alkyllead antiknock compounds are well known to those skilled in the art and will be exemplified in more detail hereinafter.

A preferred type of hydrocarbon for use in our antiknock fluids are those which boil between about 50 and about 220° C. at atmospheric pressure and which are soluble in tetraethyllead at 25° C. to the extent of at least about 5 percent by weight. Hydrocarbons boiling within this range have the advantage of not exceeding the end boiling point of the majority of the commercially available gasolines in use today. Furthermore, these preferred hydrocarbons have the optimum volatility for smooth and efficient induction into modern gasoline engines and thus do not contribute to induction system problems.

Another group of preferred hydrocarbons are those which boil between about 1° and about 300° C. at atmospheric pressure and have a solubility in tetraethyllead at 25° C. of at least about 15 percent by weight. Hydrocarbons having this tetraethyllead solubility are of particular advantage in that the resultant antiknock fluid compositions tend to remain homogeneous even when stored under low temperature conditions such as encountered during winter.

The most suitable class of hydrocarbons for use according to the invention are those which boil between about 50 and about 220° C. at atmospheric pressure and have a solubility in tetraethyllead at 25° C. of at least about 15 percent by weight.

The ethylene dibromide content of the present systems ranges from about 0.05 to about 0.4 mole per mole of tetraethyllead (or per mole of tetraethyllead containing alkyllead mixture). It is preferable, however, to utilize the ethylene dibromide in concentrations equivalent to from about 0.05 to about 0.20 mole per mole of the tetraethyllead or tetraethyllead-containing alkyllead mixture because such compositions are most economic and the resultant gasoline compositions incur the least amount of engine corrosion.

As specified above the present systems preferably involve the use of tetraethyllead itself. However, the synergistic effects according to the invention are also obtainable in tetraethyllead-containing mixtures of alkyllead compounds. Examples of such mixtures include:

(A)

| | Mole percent |
|---|---|
| Tetramethyllead | 10 |
| Tetraethyllead | 90 |

(B)

| | |
|---|---|
| Tetramethyllead | 25 |
| Tetraethyllead | 75 |

(C)

| | |
|---|---|
| Tetramethyllead | 50 |
| Tetraethyllead | 50 |

(D)

| | |
|---|---|
| Tetramethyllead | 75 |
| Tetraethyllead | 25 |

(E)

| | |
|---|---|
| Tetramethyllead | 90 |
| Tetraethyllead | 10 |

(F)

| | |
|---|---|
| Tetramethyllead | 20 |
| Diethyldimethyllead | 20 |
| Tetraethyllead | 60 |

(G)

| | Weight percent |
|---|---|
| Tetramethyllead | 0.4 |
| Ethyltrimethyllead | 4.3 |
| Diethyldimethyllead | 20.2 |
| Triethylmethyllead | 42.1 |
| Tetraethyllead | 33.0 |

(H)

| | |
|---|---|
| Tetramethyllead | 5.7 |
| Ethyltrimethyllead | 23.8 |
| Diethyldimethyllead | 37.4 |
| Triethylmethyllead | 26.2 |
| Tetraethyllead | 6.9 |

(I)

| | |
|---|---|
| Tetramethyllead | 30.0 |
| Ethyltrimethyllead | 42.1 |
| Diethyldimethyllead | 22.2 |
| Triethylmethyllead | 5.2 |
| Tetraethyllead | 0.5 |

These systems may be readily formulated by those skilled in the art. Because of the mutual solubility of the several ingredients utilized in formulating these compositions, it is only necessary to bring the ingredients together in a suitable vessel such as a blending tank. It is helpful to agitate the mixture to some extent to insure homogeneity.

To illustrate the effectiveness of the invention, a series of direct comparisons were made of the decomposition characteristics of unstabilized and stabilized tetraethyllead samples. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of 195° C., the sample-containing tube was quickly immersed in the bath and clamped with the levelling bottle adjusted to hold the gas buret in place at a zero reading. Then measured was the time during which the sample was held at 195° C. without pronounced thermal decomposition and consequent gas evolution occurring. Thus, the longer the time, the more thermally stable was the alkyllead composition.

With pure tetraethyllead used in 1 ml. amounts, pronounced thermal deterioration occurred almost immediately as evidenced by rapid gas evolution. In fact, the decomposition of unstabilized tetraethyllead will normally become uncontrollable if it is heated, whether rapidly or slowly, to even 130° C., unless it is possible to very rapidly cool it down to about 100° C. or below.

A number of the other compositions tested in the manner described above and the results thereby obtained are shown in Table I, in which EDB stands for ethylene dibromide.

TABLE I.—EFFECT OF ADDITIVES ON THERMAL DECOMPOSITION OF TETRAETHYLLEAD AT 195° C.

| Example | Run No. | Additive complement [1] | Thermal stability, time to decomposition, minutes [2] |
|---|---|---|---|
| I | 1 | 2,5-dimethyl-2,4-hexadiene (15) + EDB (0.05). | >300 [<144] |
|  | 2 | EDB (0.05) | <1 |
|  | 3 | 2,5-dimethyl-2,4-hexadiene (15) | 143 |
| II | 1 | Alpha-pinene (15) + EDB (0.05) | 103 [<14] |
|  | 2 | EDB (0.05) | <1 |
|  | 3 | Alpha-pinene (15) | 13 |
| III | 1 | Dipentene (5) + EDB (0.05) | 32 [<7] |
|  | 2 | EDB (0.05) | <1 |
|  | 3 | Dipentene (5) | 6 |
| IV | 1 | Naphthalene (5) + EDB (0.1) | 69 [15] |
|  | 2 | EDB (0.1) | 3 |
|  | 3 | Naphthalene (5) | 12 |
| V | 1 | Alpha-methyl naphthalene (15) + EDB (0.05) | 56 [<11] |
|  | 2 | EDB (0.05) | <1 |
|  | 3 | Alpha-methyl naphthalene (15) | 10 |

See footnotes at end of table.

TABLE I—Continued

| Example | Run No. | Additive complement [1] | Thermal stability, time to decomposition, minutes [2] |
|---|---|---|---|
| VI | 1 | Mixed fused ring aromatics [3] (5) + EDB (0.05). | 13 [<10] |
| | 2 | EDB (0.05) | <1 |
| | 3 | Mixed fused ring aromatics [3] | 9 |
| VII | 1 | Mixed fused ring aromatics [3] (5) + EDB (0.25). | 86 [49] |
| | 2 | EDB (0.25) | 43 |
| | 3 | Mixed fused ring aromatics [3] | 6 |
| VIII | 1 | Xylene (15) + EDB (0.1) | 93 [10] |
| | 2 | EDB (0.1) | 3 |
| | 3 | Xylene (15) | 7 |
| IX | 1 | p-Cymene (5) + EDB (0.1) | 40 [5] |
| | 2 | EDB (0.1) | 3 |
| | 3 | p-Cymene (5) | 2 |
| | 4 | p-Cymene (15) | 7 |
| X | 1 | 1,2,4-trimethylbenzene (5) + EDB (0.05). | 16 [<4] |
| | 2 | EDB (0.05) | <1 |
| | 3 | 1,2,4-trimethylbenzene (5) | 3 |
| | 4 | 1,2,4-trimethylbenzene (15) | 7 |
| XI | 1 | Styrene (15) + EDB (0.05) | 253 [<43] |
| | 2 | EDB (0.05) | <1 |
| | 3 | Styrene (15) | 42 |
| XII | 1 | Alpha-methyl styrene (1) + EDB (0.05) | 76 [<20] |
| | 2 | EDB (0.05) | <1 |
| | 3 | Alpha-methyl styrene (1) | 19 |
| XIII | 1 | Bicycloheptadiene (15) + EDB (0.1). | 37 [7] |
| | 2 | EDB (0.1) | 3 |
| | 3 | Bicycloheptadiene (15) | 4 |
| XIV | 1 | Cyclooctadiene (5) + EDB (0.05) | 45 [<15] |
| | 2 | EDB (0.05) | <1 |
| | 3 | Cyclooctadiene (5) | 14 |
| XV | 1 | Dicyclopentadiene (15) + EDB (0.05). | 43 [<32] |
| | 2 | EDB (0.05) | <1 |
| | 3 | Dicyclopentadiene (15) | 31 |
| XVI | 1 | Indene (1)+EDB (0.05) | 38 [<7] |
| | 2 | EDB (0.05) | <1 |
| | 3 | Indene (1) | 6 |
| XVII | 1 | n-Decane (5)+EDB (0.05) | 28 [<2] |
| | 2 | EDB (0.05) | <1 |
| | 3 | n-Decane (5) | <1 |
| | 4 | n-Decane (15) | <1 |
| XVIII | 1 | 2,2,4-trimethylpentane (5)+EDB (0.1). | 9 [<4] |
| | 2 | EDB (0.1) | 3 |
| | 3 | 2,2,4-trimethylpentane (5) | <1 |
| | 4 | 2,2,4-trimethylpentane (15) | <1 |
| XIX | 1 | Paraffin mixture [4] (15)+EDB (0.1). | 26 [6] |
| | 2 | EDB (0.1) | 3 |
| | 3 | Paraffin mixture [4] (15) | 3 |
| XX | 1 | Solvent oil (Top oil) (15)+EDB (0.05). | 23 [<6] |
| | 2 | EDB (0.05) | <1 |
| | 3 | Solvent oil (Top oil) (15) | 5 |
| XXI | 1 | $C_{10}C_{18}$ alpha-olefin mixture [5] (5) +EDB (0.1). | 34 [5] |
| | 2 | EDB (0.1) | 3 |
| | 3 | $C_{10}C_{18}$ alpha-olefin mixture [5] (5) | 2 |
| | 4 | $C_{10}C_{18}$ alpha-olefin mixture [5] (15) | 8 |
| XXII | 1 | 2-ethyl-1-hexene (5)+EDB (0.05) | 6 [<3] |
| | 2 | EDB (0.05) | <1 |
| | 3 | 2-ethyl-1-hexene (5) | 2 |
| | 4 | 2-ethyl-1-hexene (15) | 4 |
| XXIII | 1 | 1-Decene (5)+EDB (0.05) | 12 [<4] |
| | 2 | EDB (0.05) | <1 |
| | 3 | 1-Decene (5) | 3 |
| | 4 | 1-Decene (15) | 11 |
| XXIV | 1 | 1-Heptene (5)+EDB (0.1) | 9 [5] |
| | 2 | EDB (0.1) | 3 |
| | 3 | 1-Heptene (5) | 2 |
| | 4 | 1-Heptene (15) | 3 |
| XXV | 1 | Cyclopentene (15)+EDB (0.05) | 4 [<3] |
| | 2 | EDB (0.05) | <1 |
| | 3 | Cyclopentene (15) | 2 |
| XXVI | 1 | 4-methyl-1-cyclohexene (15) +EDB (0.05). | 274 [<211] |
| | 2 | EDB (0.05) | <1 |
| | 3 | 4-methyl-1-cyclohexene (15) | 210 |
| XXVII | 1 | 1,5-hexadiene (5)+EDB (0.1) | 7 [5] |
| | 2 | EDB (0.1) | 3 |
| | 3 | 1,5-hexadiene (5) | 2 |
| | 4 | 1,5-hexadiene (15) | 3 |
| XXVIII | 1 | 1-hexyne (5)+EDB (0.1) | 6 [<4] |
| | 2 | EDB (0.1) | 3 |
| | 3 | 1-hexyne (5) | <1 |
| | 4 | 1-hexyne (15) | <1 |
| XXIX | 1 | Cyclohexane (5)+EDB (0.05) | 4 [<2] |
| | 2 | EDB (0.05) | <1 |
| | 3 | Cyclohexane (5) | <1 |
| | 4 | Cyclohexane (15) | <1 |
| XXX | 1 | Methylcyclohexane (15)+EDB (0.05). | 3 [<2] |
| | 2 | EDB (0.05) | <1 |
| | 3 | Methylcyclohexane (15) | <1 |
| XXXI | 1 | Kerosene (1)+EDB (0.05) | 18 [<2] |
| | 2 | EDB (0.05) | <1 |
| | 3 | Kerosene (1) | <1 |
| | 4 | Kerosene (5) | <1 |
| XXXII | 1 | Kerosene (1)+EDB (0.4) | 107 [<98] |
| | 2 | EDB (0.4) | 97 |
| | 3 | Kerosene (1) | <1 |
| | 4 | Kerosene (5) | <1 |
| XXXIII | 1 | Diesel fuel (1)+EDB (0.05) | 9 [<2] |
| | 2 | EDB (0.05) | <1 |
| | 3 | Diesel fuel (1) | <1 |
| | 4 | Diesel fuel (5) | <1 |

See footnotes at end of table.

[1] Figures in parentheses show the concentrations employed. In the case of the ethylene dibromide (EDB) the number represents the number of moles per mole of tetraethyllead (TEL). In the case of the hydrocarbon additive, the number represents the weight percentage thereof based on the weight of the tetraethyllead.
[2] Figures in brackets show the calculated time to decomposition based upon the summation of the values obtained from each of the additives when used separately at the same concentrations.
[3] A commercially available mixture of fused ring aromatic hydrocarbons was shown by infrared and ultra-violet analyses to contain a significant quantity of dimethyl naphthalene isomers as well as some highly polynuclear aromatic compounds. This mixture has the following distillation temperature profile (° C.): Initial 254, 10% 267, 50% 282, 90% 307, Final 323.
[4] High flash Stoddard solvent.
[5] A mixture of predominantly straight chain alpha-olefins composed by weight of 0.7% $C_{10}$ olefins, 29.5% $C_{12}$ olefins, 30.4% $C_{14}$ olefins, 30.7% $C_{16}$ olefins and 8.7% $C_{18}$ olefins.

It will be seen from the above data that in all cases a significant synergistic effect was achieved. It will also be noted that from the standpoint of maximum absolute induction times the above data indicate that the best results are achieved through the use of terpene hydrocarbons, fused ring aromatic hydrocarbons, mononuclear aromatic hydrocarbons (including vinyl aromatics), cyclic diene hydrocarbons, acyclic paraffin hydrocarbons, mixtures of monoolefinic hydrocarbons, and conjugated acyclic diene hydrocarbons.

Thus, as shown by the above data, one way by which the synergistic effects of the invention is manifested is the synergistic prolongation of the time during which the tetraethyllead can be subjected to temperatures as high as 195° C. before appreciable decomposition commences.

Another way by which the synergism of the invention manifests itself is through a synergistic reduction in the rate of the thermal decomposition of the tetraethyllead once the induction period has passed and the decomposition reactions begin to occur. This is a synergistic rate suppression phenomenon whereby even though the composition decomposes the rate and, therefore, the violence of the overall decomposition is reduced to a much milder level. The significance of this is that even though the decomposition takes place in force and violence and are significantly reduced so that in many cases an appropriate pressure relief valve or other safety device will be sufficient to release the pressure building up within the system on decomposition.

In order to quantitatively measure the extent to which the compositions of the present invention manifest this decomposition rate suppression, various compositions according to the invention were subjected to the test conditions described hereinabove and maintained at 195° C. for a time sufficient for the thermal decomposition to commence. At this point, measurements were made of the amount of gas liberated per incremental units of time. Thereupon, these measurements were translated into a common rate factor, namely the percentage of the decomposition occurring per minute. Most of the compositions tested in this manner exhibited this form of synergistic effect. In fact, most of the compositions exhibited synergism from both the standpoint of prolongation of induction times to decomposition and of rate of decomposition once it commenced. Some typical data showing the latter type of synergistic behavior are presented in Table II.

TABLE II.—EFFECT OF ADDITIVES ON THERMAL DECOMPOSITION OF TETRAETHYLLEAD AT 195° C.

| Example | Run No. | Additive complement [1] | Thermal stability rate of decomposition, percent TEL decomposed per minute [2] |
|---|---|---|---|
| XXXIV | 1 | Methylcyclohexane (15) + EDB (0.05). | 25.2 [54.2] |
|  | 2 | EDB (0.05) | 46.1 |
|  | 3 | Methylcyclohexane (15) | 62.2 |
| XXXV | 1 | Cyclohexene (15) + EDB (0.1) | 20.9 [35.7] |
|  | 2 | EDB (0.1) | 32.9 |
|  | 3 | Cyclohexene (15) | 38.4 |
| XXXVI | 1 | 4-methyl-1-pentene (15) + EDB (0.05). | 20.0 [51.9] |
|  | 2 | EDB (0.05) | 46.1 |
|  | 3 | 4-methyl-1-pentene (15) | 57.6 |
| XXXVII | 1 | Paraffin mixture [3] (15) + EDB (0.1). | 9.6 [29.3] |
|  | 2 | EDB (0.1) | 32.9 |
|  | 3 | Paraffin mixture [3] (15) | 25.6 |
| XXXVIII | 1 | Xylene (15) + EDB (0.1) | 3.3 [19.5] |
|  | 2 | EDB (0.1) | 32.9 |
|  | 3 | Xylene (15) | 6.0 |
| XXXIX | 1 | Phenyl acetylene (15) + EDB (0.05). | 5.5 [28.8] |
|  | 2 | EDB (0.05) | 46.1 |
|  | 3 | Phenyl acetylene (15) | 11.5 |
| XL | 1 | Tetrahydronaphthalene (5) + EDB (0.1). | 1.3 [246.5] |
|  | 2 | EDB (0.1) | 32.9 |
|  | 3 | Tetrahydronaphthalene (5) | 460 |
| XLI | 1 | Mixed fused ring aromatic hydrocarbons [4] (15) + EDB (0.05). | 0.9 [33.5] |
|  | 2 | EDB (0.05) | 46.1 |
|  | 3 | Mixed fused ring aromatic hydrocarbons [4] (15). | 20.9 |
| XLII | 1 | Diesel fuel (1) + EDB (0.4) | 23.5 [32.1] |
|  | 2 | EDB (0.4) | 28.8 |
|  | 3 | Diesel fuel (1) | 35.4 |
| XLIII | 1 | Indene (1) + EDB (0.05) | 32.9 [48.7] |
|  | 2 | EDB (0.05) | 46.1 |
|  | 3 | Indene (1) | 51.2 |

[1] Figures in parentheses show the concentrations employed. In the case of the ethylene dibromide (EDB) the number represents the number of moles per mole of tetraethyllead (TEL). In the case of the hydrocarbon additive, the number represents the weight percentage thereof based on the weight of the tetraethyllead.
[2] Figures in brackets show the calculated rate of decomposition based upon the average of the decomposition rates from each of the additives when used separately at the same concentrations.
[3] High flash Stoddard solvent.
[4] A commercially available mixture of fused ring aromatic hydrocarbons having a distillation temperature profile (° C.) of Initial 232, 10% 241, 50% 247, 90% 260, Final 279. Instrumental chemical analysis showed this hydrocarbon mixture to contain, inter alia, significant quantities of 2-methyl naphthalene and various dimethyl naphthalenes principally 1,3-dimethylnaphthalene, 1,4-dimethylnaphthalene, and 1,6-dimethylnaphthalene.

Examples of suitable hydrocarbons for use in practicing the invention are given below. For purposes of classification, these hydrocarbons are grouped in accordance with their boiling points at atmospheric pressure.

1–49° C.: 2,2-dimethylpropane, 2-methylbutane, n-pentane, 2,2-dimethylbutane, cis-butene-2, pentene-1, 2-methylbutene-2, butadiene-1,2, pentadiene-1,2, pentadiene-1,4, 3-methylbutadiene-1,2, ethylcyclopropane, 1,2-dimethylcyclopropane, 1,1-dimethylcyclopropane, ethylidenecyclopropane.

50–89° C.: n-hexane, 2-methylpentane, 2,2-dimethylpentane, 2,3-dimethylbutane, hexene-1, 2-methylpentene-1, 2,3-dimethylbutene-2, 4-methylhexene-1, 3-ethylpentene-1, hexadiene-1,2, hexadiene-1,5, hexadiene-2,4, 4-methylpentadiene-1,3, propylcyclopropane, 1,1,2-trimethylcyclopropane, 1,2-dimethylcyclobutane, 1,1-dimethylcyclopentane, cyclohexane, isopropylidenecyclopropane, benzene, and hexyne-2.

90–150° C.: ethylbenzene, toluene, p-xylene, m-xylene, o-oxylene, mixed xylene isomers, 2,2,3,3-tetramethylbutane, 2,3-dimethylpentane, 3-ethylpentane, 3-ethyl-2-methylpentane, 3-ethyl-3-methylpentane, 2,2,4-trimethylpentane, 2,3-dimethylhexane, 2,4-dimethylhexane, 2,5-dimethylhexane, 3,4-dimethylhexane, 2-ethylhexane, 2-methylhexane, 3-methylhexane, n-heptane, 4-ethylheptane, 2-methylheptane, 3-methylheptane, 4-methylheptane, n-octane, 3-methyloctane, n-nonane, octyne-1, octyne-2, octyne-3, octyne-4, heptyne-1, heptyne-2, and heptyne-3.

150–220° C.: n-nonane, n-decane, n-undecane, n-dodecane, 5-n-propylnonane, decene-1, d-2,6-dimethyloctene, 2,6-dimethyloctene-2, dodecene-1, 5-butylnonene-4, 3-methyloctadiene-2,4, decadiene-1,3, undecadiene-1,10, 2,6-dimethyldecadiene-2,6, 1,2-diisopropylcycylobutane, 1,2-dimethyl-3,4-diethylcyclobutane, butylcyclopentane, cis-1,2-diethylcyclopentane, propylcyclohexane, 1-cyclohexylhexene, dicyclopentylmethane, 1,2-dicyclopentylethane, 1,4-diethylbenzene, 1,3,5-trimethylbenzene (mesitylene), 1-methyl-2-ethyl benzene, n-propyl benzene, 1-methyl-3-ethyl-4-isopropylcyclohexane, naphthalene, decahydronaphthalene, and 2-ethylnaphthalene.

221–300° C.: 5-methyldodecane, n-tetradecane, 4,5-di-n-propyloctane, n-pentadecane, n-hexadecane, 3,7,11-trimethyldodecene-1, hexadecene-1, 2,11-dimethyldodecadiene-1,11, 2,11-dimethyldodecadiene-2,10, hexylcyclohexane, 3-methyl-3-cyclohexylhexane, 3-ethyl-3-cyclohexylpentane, 1-ethylnaphthalene, 1-methylnaphthalene, 2-methylnaphthalene, 4-cyclohexylheptane, 1-cyclohexylcyclohexene-1, d-3-methyl-1-(5-methylcyclohexyl)-cyclohexene-1, 5-methyl-2-isopropyl-1-cyclohexyl-cyclohexene-1, 2-methylcyclopentylcyclohexane, dicyclohexylmethane, 1,2-dicyclohexylethane, 4,4'-dimethyldicyclohexyl, pentamethylbenzene, n-hexylbenzene, hexamethylbenzene, 1-cyclopentyl-2-phenylethane, and 1-benzyl-2-methyl-4-ethylbenzene.

Particularly preferred from the cost-effectiveness standpoint and also from the standpoint of optimum compatibility and non-polymerizability in tetraethyllead are the following types of hydrocarbons:

(1) Acyclic paraffinic hydrocarbons, especially hydrocarbon mixtures composed predominantly thereof;
(2) Mono-nuclear aromatic hydrocarbons containing only aromatic unsaturation, or hydrocarbon mixtures composed predominantly thereof;
(3) Fused ring aromatic hydrocarbons containing only polynuclear aromatic unsaturation, or hydrocarbon mixtures composed predominantly thereof;
(4) Cyclic diene hydrocarbons containing only ring unsaturation, or hydrocarbon mixtures composed predominantly thereof;
(5) Terpene hydrocarbons, or hydrocarbon mixtures composed predominantly thereof;

where these hydrocarbons boil, at atmospheric pressure, between about 1° and about 300° C. (and preferably between about 50 and about 220° C.) and have a solubility in tetraethyllead at 25° C. of at least about 5 percent by weight (and preferably at least about 15 percent by weight). Mixtures of two or more of the above enumerated hydrocarbons may be used in practicing the invention. As noted above, vinyl aromatic hydrocarbons, mixtures of monoolefinic hydrocarbons (cyclic and/or acyclic) and conjugated acyclic diene hydrocarbons are also effective. However, these materials are less preferable for use in carrying out the invention as they may tend to polymerize when maintained in contact with tetraethyllead under conditions conducive to polymerization (i.e. storage for relatively long periods of time at temperatures of about 60–80° C. in the presence of oxygen or air). Nonetheless, these materials are effective in suppressing the thermal decomposition of tetraethyllead when utilized in accordance with the present invention.

In describing the invention, the phrase "essentially consisting of" or "containing" has been used. By these terms is meant that the compositions are made up of the several stated ingredients in the proportions described and that essentially the entire composition is composed thereof. This is not to say that certain other ingredients may not be utilized in conjunction therewith because this is entirely feasible and practical provided that these other ingredients are selected with due care so as not to detract from the synergistic effects promulgated pursuant to this invention. Therefore, the foregoing phrase should be understood as enabling the co-presence in the compositions of certain carefully selected ingredients in accordance with the principles set forth below.

One type of material which can be and is preferably used in the present compositions is an appropriate oil soluble dye. The nature of these materials is well known to those skilled in the art and needs no amplification here. These organic materials are conventionally used in the art for identification purposes. Such dyestuffs are utilized in relatively small concentrations (e.g., about 0.010 to about 0.1 weight percent based on the total composition) and do not detract from the synergistic benefits of the invention.

Another type of conventional gasoline additive which may be used in conjunction with the several ingredients of the present embodiment are phenolic inhibitors. These materials are likewise used at very low concentrations in the present compositions and confer thereupon an additional property of enhanced resistance against oxidative deterioration—i.e., sludge formation which may occur upon exposure of an antiknock fluid concentrate to the air for reasonably long periods of time. These phenolic inhibitors are generally sterically hindered phenols, preferably mono-nuclear mono-hydric phenols exemplified by 2,6-di-tert-butyl phenol; 2,4,6-tri-tert-butyl phenol; 4-methyl-2,6-di-tert-butyl phenol; 2,4-di-methyl-6-tert-butyl phenol; a mixture of o-tert-butyl phenol, 2,6-di-tert-butyl phenol, and 2,4,6-tri-tert-butyl phenol; and the like.

These materials do not adversely affect the synergistic effects of the present compositions, especially when used in concentrations ranging from about 0.02 to about 0.2 weight percent based on the total composition.

Propylene dibromide may be used in addition to the ethylene dibromide in formulating the present compositions. The propylene dibromide is a homolog of ethylene dibromide and for the purposes of the present invention is entirely equivalent thereto.

Experimental work has shown that ethylene dichloride may also be used in the present compositions without materially detracting from the synergistic effects noted above. From the standpoint of maximum cost-effectiveness, the total moles of ethylene dibromide and/or propylene dibromide plus ethylene dichloride should not exceed about 2 moles (and preferably about 1 mole) per mole of tetraethyllead. It is definitely preferable to utilize an amount of ethylene dichloride such that there are from about 0.8 to about 1.5 moles thereof per mole of tetraethyllead.

Another material which may be present in the compositions of the present embodiment is N,N'-disalicylidene-1,2-diamino propane, a well known metal deactivator. When this material is present in amounts ranging from about 0.2 to about 3 weight percent based on the total composition, the above-described synergistic effects are not adversely affected.

As noted above, the compositions of this invention may contain other tetraalkyllead in addition to the tetraethyllead as these tetraethyllead-containing mixtures are generally equivalent to the tetraethyllead itself insofar as the thermal stability problem is concerned. The amounts and identity of these other tetraalkyllead compounds which may be present in this embodiment have been presented above.

Highly oxygenated substances should likewise be absent from the present compositions as these materials tend on decomposition to foster the formation of free radicals and thereby accelerate the decomposition phenomena. Peroxides, such as organic peroxides and organic hydroperoxides serve as examples of highly oxygenated materials that should be excluded from the compositions of this invention.

What is claimed is:

1. A concentrated antiknock fluid composition essentially consisting of tetraethyllead and a synergistic thermal stabilizer mixture of from about 0.05 to about 0.4 mole of ethylene dibromide per mole of tetraethyllead and from about 1 to about 150 weight percent, based on the weight of the tetraethyllead, of a hydrocarbon boiling between about 1° and about 300° C. at atmospheric presure and having a solubility in tetraethyllead at 25° C. of at least about 5 percent by weight.

2. The composition of claim 1 wherein said hydrocarbon boils between about 50 and about 220° C. at atmospheric pressure.

3. The composition of claim 1 wherein said hydrocarbon has a solubility in tetraethyllead at 25° C. of at least about 15 percent by weight.

4. The composition of claim 1 where said hydrocarbon boils between about 50 and about 220° C. at atmospheric pressure and has a solubility in tetraethyllead at 25° C. of at least about 15 percent by weight.

5. A concentrated antiknock fluid composition essentially consisting of tetraethyllead and a synergistic thermal stabilizer mixture of from about 0.05 to about 0.4 mole of ethylene dibromide per mole of tetraethyllead and from about 1 to about 30 weight percent, based on the weight of the tetraethyllead, of a hydrocarbon boiling between about 1° and about 300° C. at atmospheric pressure and having a solubility in tetraethyllead at 25° C. of at least about 5 percent by weight.

6. The composition of claim 5 wherein said hydrocarbon boils between about 50 and about 220° C. at atmospheric pressure.

7. The composition of claim 5 wherein said hydrocarbon has a solubility in tetraethyllead at 25° C. of at least about 15 percent by weight.

8. The composition of claim 5 wherein said hydrocarbon boils between about 50 and about 220° C. at atmospheric pressure and has a solubility in tetraethyllead at 25° C. of at least about 15 percent by weight.

9. A concentrated antiknock fluid composition essentially consisting of tetraethyllead and a synergistic thermal stabilizer mixture of from about 0.05 to about 0.20 mole of ethylene dibromide per mole of tetraethyllead and from about 1 to about 150 weight percent, based on the weight of the tetraethyllead, of a hydrocarbon boiling between about 1° and about 300° C. at atmospheric pressure and having a solubility in tetraethyllead at 25° C. of at least about 5 percent by weight.

10. The composition of claim 9 wherein said hydrocarbon boils between about 50 and about 220° C. at atmospheric pressure.

11. The composition of claim 9 wherein said hydrocarbon has a solubility in tetraethyllead at 25° C. of at least about 15 percent by weight.

12. The composition of claim 9 wherein said hydrocarbon boils between about 50 and about 220° C. at atmospheric pressure and has a solubility in tetraethyllead at 25° C. of at least about 15 percent by weight.

13. A concentrated antiknock fluid composition essentially consisting of tetraethyllead and a synergistic thermal stabilizer mixture of from about 0.05 to about 0.20 mole of ethylene dibromide per mole of tetraethyllead and from about 1 to about 30 weight percent, based on the weight of the tetraethyllead, of a hydrocarbon boiling between about 1° and about 300° C. at atmospheric pressure and having a solubility in tetraethyllead at 25° C. of at least about 5 percent by weight.

14. The composition of claim 13 wherein said hydrocarbon boils between about 50 and about 220° C. at atmospheric pressure.

15. The composition of claim 13 wherein said hydrocarbon has a solubility in tetraethyllead at 25° C. of at least about 15 percent by weight.

16. The composition of claim 13 wherein said hydrocarbon boils between about 50 and about 220° C. at atmospheric pressure and has a solubility in tetraethyllead at 25° C. of at least about 15 percent by weight.

17. The composition of claim 1 wherein said hydrocarbon is selected from the group consisting of
 (1) acyclic paraffinic hydrocarbons,
 (2) mono-nuclear aromatic hydrocarbons containing only aromatic unsaturation,
 (3) fused ring aromatic hydrocarbons containing only polynuclear aromatic unsaturation,
 (4) cyclic diene hydrocarbons containing only ring unsaturation,
 (5) terpene hydrocarbons, and
 (6) mixtures composed predominantly of hydrocarbons as defined in 1–5, inclusive.

18. The composition of claim 5 wherein said hydrocarbon is selected from the group consisting of
 (1) acyclic paraffinic hydrocarbons,
 (2) mono-nuclear aromatic hydrocarbons containing only aromatic unsaturation,
 (3) fused ring aromatic hydrocarbons containing only polynuclear aromatic unsaturation,
 (4) cyclic diene hydrocarbons containing only ring unsaturation,
 (5) terpene hydrocarbons, and
 (6) mixtures composed predominantly of hydrocarbons as defined in 1–5, inclusive.

19. The composition of claim 9 wherein said hydrocarbon is selected from the group consisting of
 (1) acyclic paraffinic hydrocarbons,
 (2) mono-nuclear aromatic hydrocarbons containing only aromatic unsaturation,
 (3) fused ring aromatic hydrocarbons containing only polynuclear aromatic unsaturation,
 (4) cyclic diene hydrocarbons containing only ring unsaturation,
 (5) terpene hydrocarbons, and
 (6) mixtures composed predominantly of hydrocarbons as defined in 1–5, inclusive.

20. The composition of claim 13 wherein said hydrocarbon is selected from the group consisting of
 (1) acyclic paraffinic hydrocarbons,
 (2) mono-nuclear aromatic hydrocarbons containing only aromatic unsaturation,
 (3) fused ring aromatic hydrocarbons containing only polynuclear aromatic unsaturation,
 (4) cyclic diene hydrocarbons containing only ring unsaturation,
 (5) terpene hydrocarbons, and
 (6) mixtures composed predominantly of hydrocarbons as defined in 1–5, inclusive.

References Cited by the Examiner

UNITED STATES PATENTS

| | | | |
|---|---|---|---|
| 1,815,753 | 7/1931 | Wilson | 44—69.1 |
| 2,660,595 | 11/1953 | Calingaert | 260—437 |
| 2,836,568 | 5/1958 | Ecke et al. | 260—437 |
| 2,860,958 | 11/1958 | Gilbert et al. | 252—386 |
| 3,147,294 | 9/1964 | Cook | 260—437 |

FOREIGN PATENTS

| | | |
|---|---|---|
| 670,526 | 4/1952 | Great Britain. |
| 718,567 | 11/1954 | Great Britain. |

TOBIAS E. LEVOW, *Primary Examiner.*